United States Patent
Raisch

(10) Patent No.: US 11,209,075 B2
(45) Date of Patent: Dec. 28, 2021

(54) TRANSMISSION

(71) Applicant: DEERE & COMPANY, Moline, IL (US)

(72) Inventor: Stefan Raisch, Vaihingen/Enz (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/946,637

(22) Filed: Jun. 30, 2020

(65) Prior Publication Data
US 2021/0025484 A1 Jan. 28, 2021

(30) Foreign Application Priority Data
Jul. 22, 2019 (DE) .......................... 102019210847.4

(51) Int. Cl.
*F16H 37/06* (2006.01)

(52) U.S. Cl.
CPC ..... *F16H 37/06* (2013.01); *F16H 2200/0034* (2013.01)

(58) Field of Classification Search
CPC ............. F16H 37/06; F16H 2200/0034; F16H 2200/0026; F16H 37/046; F16H 2037/048
USPC ......................................................... 475/218
See application file for complete search history.

(56) References Cited

U.S. PATENT DOCUMENTS

| | | | |
|---|---|---|---|
| 3,430,518 A | 3/1969 | Auriol | |
| 4,658,672 A | 4/1987 | Michael | |
| 6,190,280 B1 * | 2/2001 | Horsch | F16H 37/042 475/209 |
| 6,893,373 B2 | 5/2005 | Kawamoto et al. | |
| 8,262,530 B2 | 9/2012 | Bailly et al. | |
| 9,279,498 B2 * | 3/2016 | Kaltenbach | F16H 61/702 |
| 9,920,824 B1 * | 3/2018 | Hwang | F16H 37/065 |
| 10,240,668 B2 | 3/2019 | Raisch | |
| 2003/0148847 A1 | 8/2003 | Kawamoto et al. | |
| 2008/0085801 A1 | 4/2008 | Sedoni et al. | |
| 2011/0111909 A1 | 5/2011 | Kim et al. | |

FOREIGN PATENT DOCUMENTS

| | | | |
|---|---|---|---|
| DE | 19606771 C2 * | 10/1998 | ............... B60K 6/26 |
| DE | 10260179 A1 * | 7/2004 | ........... F16H 37/042 |
| DE | 102006058831 A1 | 7/2007 | |

(Continued)

OTHER PUBLICATIONS

European Search Report issued in counterpart application No. 20185499.9 dated Dec. 22, 2020 (14 pages).

(Continued)

*Primary Examiner* — Sherry L Estremsky

(57) ABSTRACT

A transmission includes a first shaft, and a second shaft, and a shifting group arranged between the first and second shafts. The shifting group is configured such that a mechanical power transmitted via the first shaft is transmitted to the second shaft via a first power path or a second power path which is coupled-in or coupled-out. The first power path is designed as a forward gear and the second power path is designed as a reverse gear. The forward gear includes a different transmission ratio in magnitude from the reverse gear. The shifting group includes a summation planetary stage, where the mechanical power of the power paths is transmitted thereby to the second shaft.

13 Claims, 7 Drawing Sheets

(56) References Cited

FOREIGN PATENT DOCUMENTS

| DE | 102006054281 A1 | | 6/2008 | | |
|---|---|---|---|---|---|
| DE | 102012221881 A1 | | 6/2013 | | |
| DE | 102015201716 A1 | | 8/2016 | | |
| DE | 102015205409 A1 | | 9/2016 | | |
| EP | 1367296 A1 | | 12/2003 | | |
| WO | WO-03025431 A1 | * | 3/2003 | ........... | F16H 37/084 |
| WO | WO2013152892 A1 | | 10/2013 | | |

OTHER PUBLICATIONS

German Search Report in foreign counterpart case No. 102105211809.6 dated Jul. 7, 2016 (8 pages).
European Search Report in foreign counterpart application No. 16175537.6 dated Nov. 3, 2016 (9 pages).

* cited by examiner

TRANSMISSION

RELATED APPLICATIONS

This application claims priority to German Patent Application Ser. No. 102019210847.4, filed Jul. 22, 2019, the disclosure of which is hereby incorporated by reference in its entirety.

FIELD OF THE DISCLOSURE

The present disclosure relates to a transmission, and in particular to a transmission having a first and a second shaft and a shifting group which is arranged between the shafts.

BACKGROUND

Transmissions having a shifting group are known in principle from the prior art and serve for implementing at least one forward gear and at least one reverse gear. Generally, further shifting groups are arranged upstream and downstream of this shifting group so that a plurality of different gears may be produced, where the gears differing from one another in terms of the transmission ratio thereof, however, in order to be able to ensure load changes which are as small as possible during the shifting process.

In agricultural machines, however, it is frequently required to provide a specific crawler gear which permits very slow travel speeds. In the case of vehicles, a crawler gear serves for slow travel without a slipping clutch being required. Typical fields of use are, for example, when working in rough terrain, when transporting heavy loads or also when working in agriculture. Thus, agricultural machines frequently have a crawler gear, speeds of considerably less than 1 km/h being able to be achieved thereby and, for example, slow field work being possible thereby.

The crawler gear was generally achieved via a separate gear stage which has a transmission ratio in the region of 10. This accordingly requires additional spur gear sets with a plurality of shafts and gearwheels, as well as an additional shifting shaft, whereby the transmission as a whole is of large constructional size and at the same time the production costs may rise significantly relative to a transmission without a crawler gear.

Overall, therefore, conventional transmissions which have a crawler gear are worthy of improvement so that a transmission which provides a crawler gear is characterized by a smaller design and by lower production costs relative to the conventional transmissions.

This object is achieved by a transmission as disclosed herein, wherein according to the present disclosure the shifting group has a summation planetary stage, the mechanical power of the power paths being able to be transmitted thereby to the second shaft.

SUMMARY

In the present disclosure, a transmission may include a shifting group having a summation planetary stage, where the mechanical power of the power paths are able to be transmitted thereby to the second shaft.

Planetary stages consist of a plurality of planetary units which are arranged coaxially to one another and which are rotatable relative to one another. These planetary units may be a sun gear, a planet carrier or a ring gear. The sun gear is arranged centrally in the planetary stage and accordingly is only able to carry out a rotational movement around itself. A plurality of planet gears are arranged on this sun gear and which in turn are connected to one another via a common planet carrier. Accordingly, the planets may perform, on the one hand, a rotation around one another and, on the other hand, a rotation around the sun gear. A ring gear may then be attached to the planets. Accordingly, both the ring gear as well as the planet carrier and the sun gear have a common rotational axis. As a result, it is possible to combine together the rotational movements of the first power path and the second power path.

According to the present disclosure, the first and the second power paths differ from one another such that the first power path is configured as a forward gear and the second power path is configured as a reverse gear, so that both power paths have an opposing rotational direction. If both power paths are now combined together via the summation planetary stage, this results in the rotational movements being equalized to a large extent, wherein a slight rotation furthermore begins either in the forward direction or in the reverse direction, however, due to the different transmission ratio in the two power paths. By a careful choice of transmission ratios, therefore, according to the present disclosure it is possible to configure a crawler gear which is solely based on the coupling of the forward gear and the reverse gear without further components, for example, additional spur gear stages being required. For implementing the crawler gear it may be necessary that both the first and the second power paths are in a coupled-in state. In this context "coupled-in" means that a torque or a power may be transmitted via the corresponding power path. This is generally carried out by actuating shifting devices in the form of clutches, wherein a shifting device is provided in each power path, the corresponding power path then being able to be coupled-in or coupled-out thereby.

The summation planetary stage also comprises a shifting device which is designed either such that the first and the second power paths are able to be directly coupled together or such that one respective power path is able to be coupled to an output path of the summation planetary stage, wherein the output path is connected to the second shaft. Such a shifting device is required so that normal forward travel or reverse travel is also possible instead of the crawler gear. If, for example, the two power paths are coupled together in the summation planetary stage, this results in the planetary units which are connected to the power paths performing the same rotational movement and thus no relative movement is present between the individual planetary units. Accordingly, no transmission may be carried out via the summation planetary stage so that, as a result, the torque is directly transmitted from the corresponding power path to the output path.

In this case, and in particular for forward travel, the first power path is coupled-in and the shifting device of the summation planetary stage is actuated. The second power path, however, is not coupled-in. Accordingly, in the case of reverse travel or when engaging the reverse gear, the first power path may be coupled-out and the second power path may be coupled-in, while the shifting device of the planetary stage is also actuated.

The manner in which the two planetary units of the first and the second power paths may be blocked relative to one another substantially depends on how the shifting device is configured. Particularly suitable in this case are claw clutches, multi-disk clutches or synchronization units. Multi-disk clutches have the advantage that the rotational speeds of the first and the second power paths may be equalized when actuating the clutch, while the transmission continues to be under load. This is permitted by the multi-disk clutch consisting of a radially internal multi-disk shaft and a radially external multi-disk carrier. Both the multi-disk shaft and the multi-disk carrier have radially protruding disks which are forced against one another axially when the clutch is actuated, so that a frictional connection is produced between the multi-disk carrier and the multi-disk shaft. In such an embodiment, the multi-disk carrier and the multi-disk shaft are connected in each case to one of the power paths and in each case to one of the planetary units of the summation planetary stage.

In contrast to a multi-disk clutch, while a synchronization unit may effect an equalization of the rotational movements, this is not possible under load. In a synchronization unit, in a similar manner to a multi-disk clutch, two rotatable shafts which are arranged coaxially to one another are brought into contact on the front face by a synchronization ring, wherein the synchronization ring forms a frictional connection between the individual shafts and results in a synchronization of the rotational speeds. In a similar manner to the multi-disk clutch, the shafts are respectively connected to one of the power paths and one of the planetary units of the summation planetary stage.

In contrast to a multi-disk clutch and a synchronization unit, a synchronization of the rotational speed is not possible by a claw clutch. Thus, in order to actuate this clutch, initially the transmission has to be brought to a standstill, wherein the claw clutch may only be actuated at a standstill.

As already described above, the summation planetary stage may be configured differently, wherein at least two planetary units which are arranged coaxially to one another are provided for connecting the individual power paths. In particular, the planetary units are configured as a sun gear and as a planet carrier, wherein the planet carrier circulates around the sun gear by a plurality of individual planets. For the configuration of the output path, the summation planetary stage has a second planet carrier, wherein the planet carriers are directly coupled together and wherein the second planet carrier is connected to the second shaft. The connection to the second shaft may be carried out either directly or indirectly via a second sun gear which is driven via the second planet carrier.

According to a variant, the first or the second power path is formed in each case by a shaft arrangement, the first or second power path being connected to the summation planetary stage either directly or by incorporating a spur gear set, and wherein the shaft arrangement in each case has a shifting device, the shaft arrangement being able to be coupled-in or coupled-out thereby. By such a spur gear set a specific transmission ratio may be set within the respective power path. For example, in the case of a gearwheel pair of the spur gear stage, the coupling-in or coupling-out of the corresponding power path may be implemented by at least one of the gearwheels being arranged on a coaxial shaft portion which is arranged coaxially to a shaft, wherein the coaxial shaft portion may be connected to the internal shaft by means of a clutch.

Alternatively, the first and the second power paths may also be formed by a power-branching planetary stage.

The shifting group may also have a third power path, wherein the third power path is configured as a forward gear or as a reverse gear and has a different transmission ratio from the first power path in the case of a forward gear or from the second power path in the case of a reverse gear.

Moreover, the shifting group may also have a second summation planetary stage, wherein both summation planetary stages are connected to the first and the second power paths.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
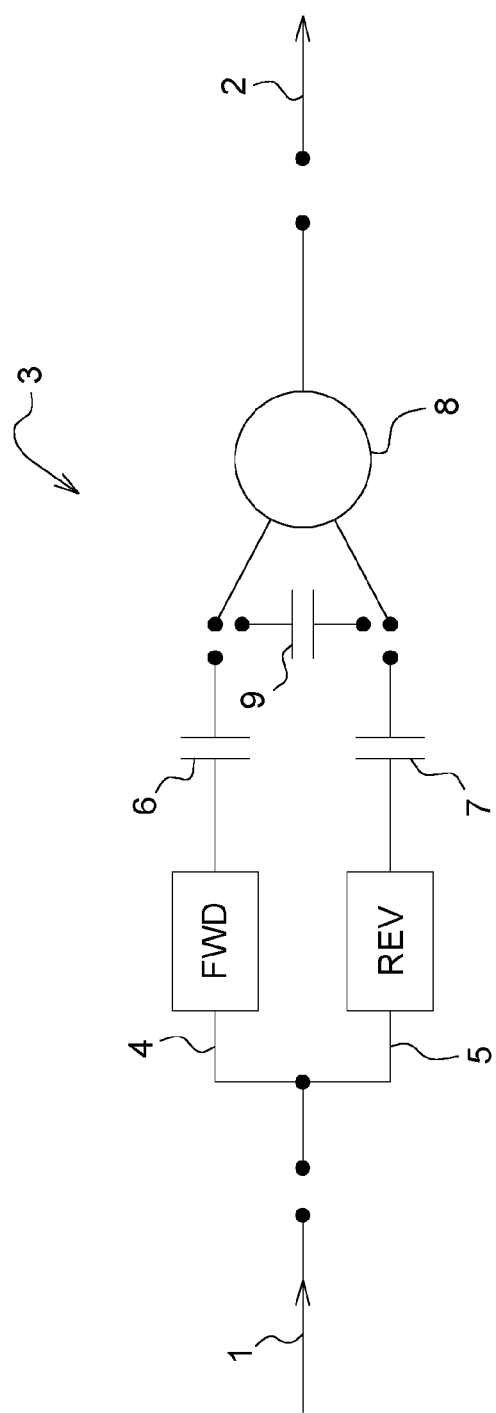
FIG. 1 is a schematic of a transmission according to the present disclosure.

FIG. 1 shows a basic sketch or schematic of a transmission according to the present disclosure with a first shaft 1 and a second shaft 2, wherein a shifting group 3 is arranged between the shafts. The shifting group 3 is configured such that a mechanical power introduced via the first shaft 1 is branched into a first power path 4 and into a second power path 5, wherein the first power path 4 is configured as a forward gear (FWD) and the second power path 5 is configured as a reverse gear (RWD).

A clutch or other shifting device 6, 7 is additionally provided in each of the power paths 4, 5, where the respective power path 4, 5 is able to be coupled-in or coupled-out thereby.

The two power paths are then combined in a summation planetary stage 8, so that the mechanical power may be transmitted to the second shaft 2. According to the embodiment of FIG. 1, a shifting device 9 is also provided. Here, the two power paths 4, 5 are able to be coupled together thereby upstream of, or directly in, the summation planetary stage 8.

Figure 2:
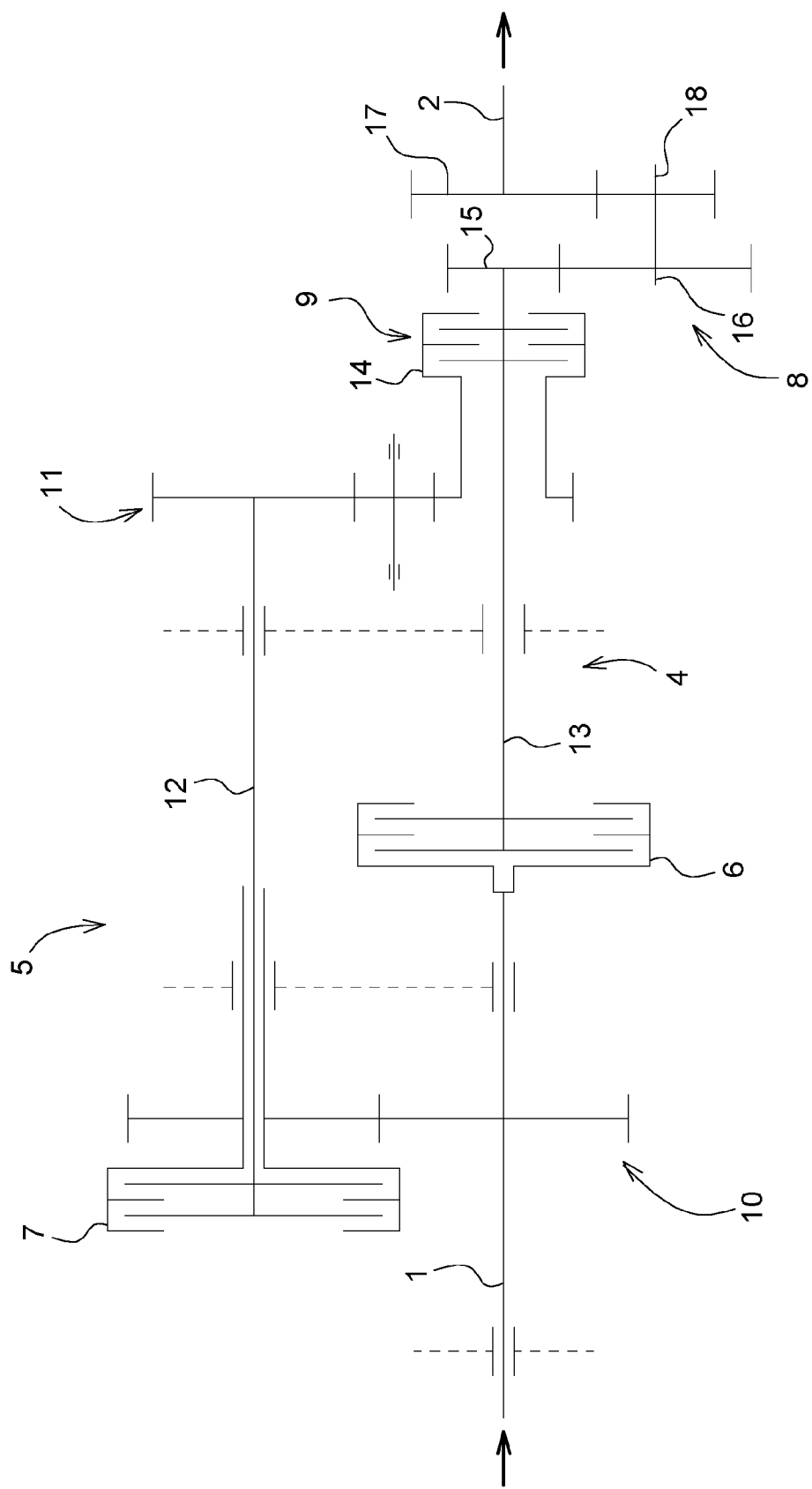
FIGS. 2, 3 and 4 are different embodiments of the present disclosure with in each case a first and a second power path.
Figure 3:
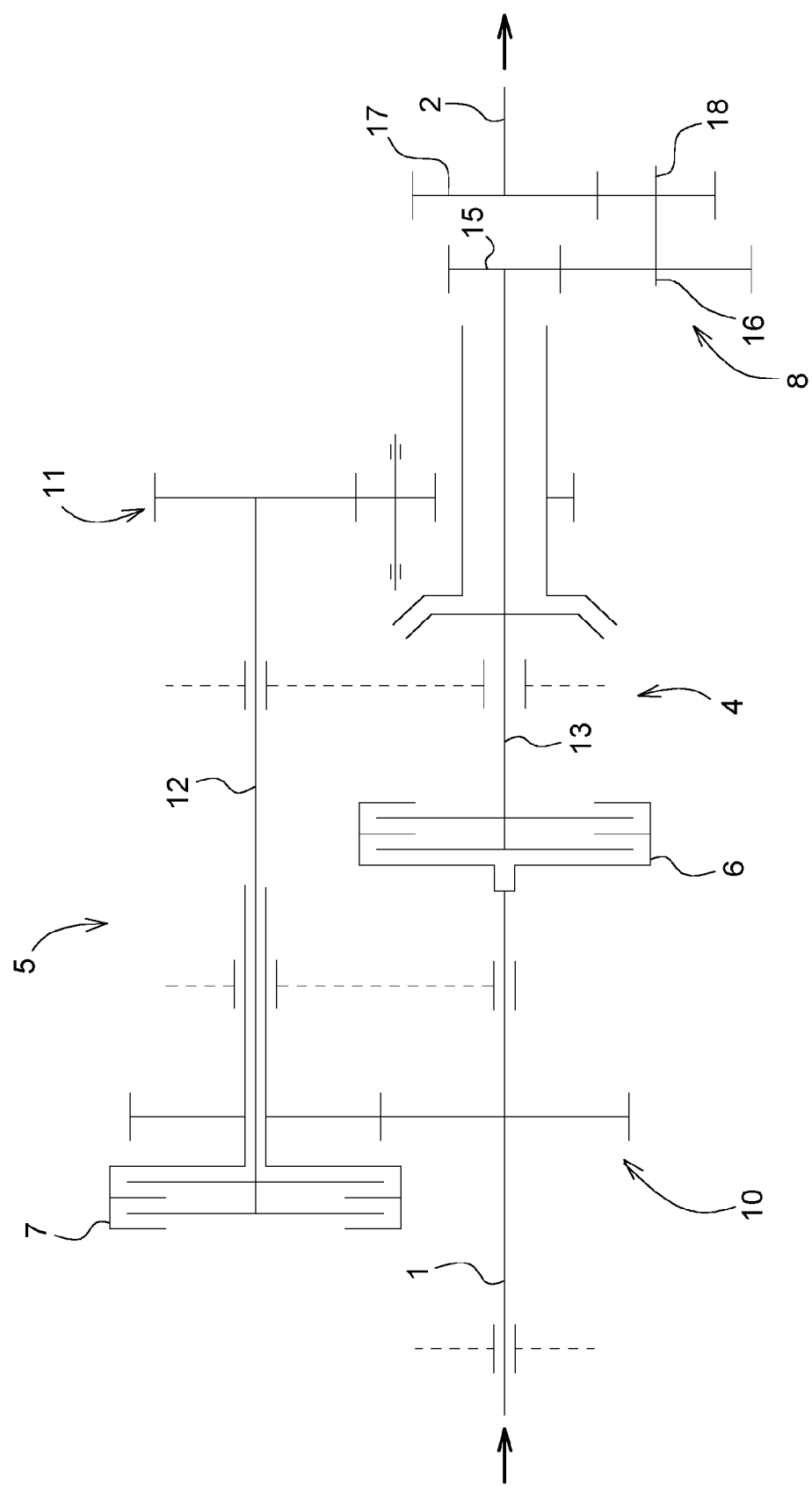

FIGS. 2 and 3 show possible embodiments wherein the second power path is connected via a spur gear set to the summation planetary stage 8, while the first power path 4 directly transitions into the summation planetary stage 8.

The spur gear set consists of a first gearwheel set 10 and a second gearwheel set 11, wherein the first gearwheel set 10 has two gearwheels in engagement with one another and the second gearwheel set 11 has three gearwheels in engagement with one another, a reversal of the rotational direction being achieved thereby. An auxiliary shaft 12 is also provided between the first gearwheel set 10 and the second gearwheel set 11, the auxiliary shaft 12 connecting together the two gearwheel sets 10, 11. The shifting device 7 is implemented as a multi-disk clutch, the first gearwheel set 10 being able to be coupled thereby to the auxiliary shaft 12.

A shifting device 6 is also provided in the first power path 4 as a multi-disk clutch which couples the first shaft 1 directly to a multi-disk shaft 13. This multi-disk shaft is part of the shifting device 9 of the summation planetary stage 8. The multi-disk carrier 14 is directly connected to the gearwheel set 11. Thus, the two power paths 4, 5 may be coupled together via the shifting device 9, wherein this is only possible or expedient when one of the two power paths is decoupled in order to permit a forward gear or a reverse gear (FWD, RWD).

The multi-disk shaft 13 is thus directly connected to the sun gear 15 of the summation planet shaft and the multi-disk carrier 14 is directly connected to the first planet carrier 16 of the summation planetary stage 8.

The summation planetary stage 8 also has a second sun gear 17 which is connected to the second shaft 2 and which is connected via a second planet carrier 18 to the first planet carrier 16 of the summation planetary stage 8.

According to FIG. 3, instead of a multi-disk clutch, the shifting device 9 is formed via a synchronization unit, wherein the remaining components remain the same.

Figure 4:
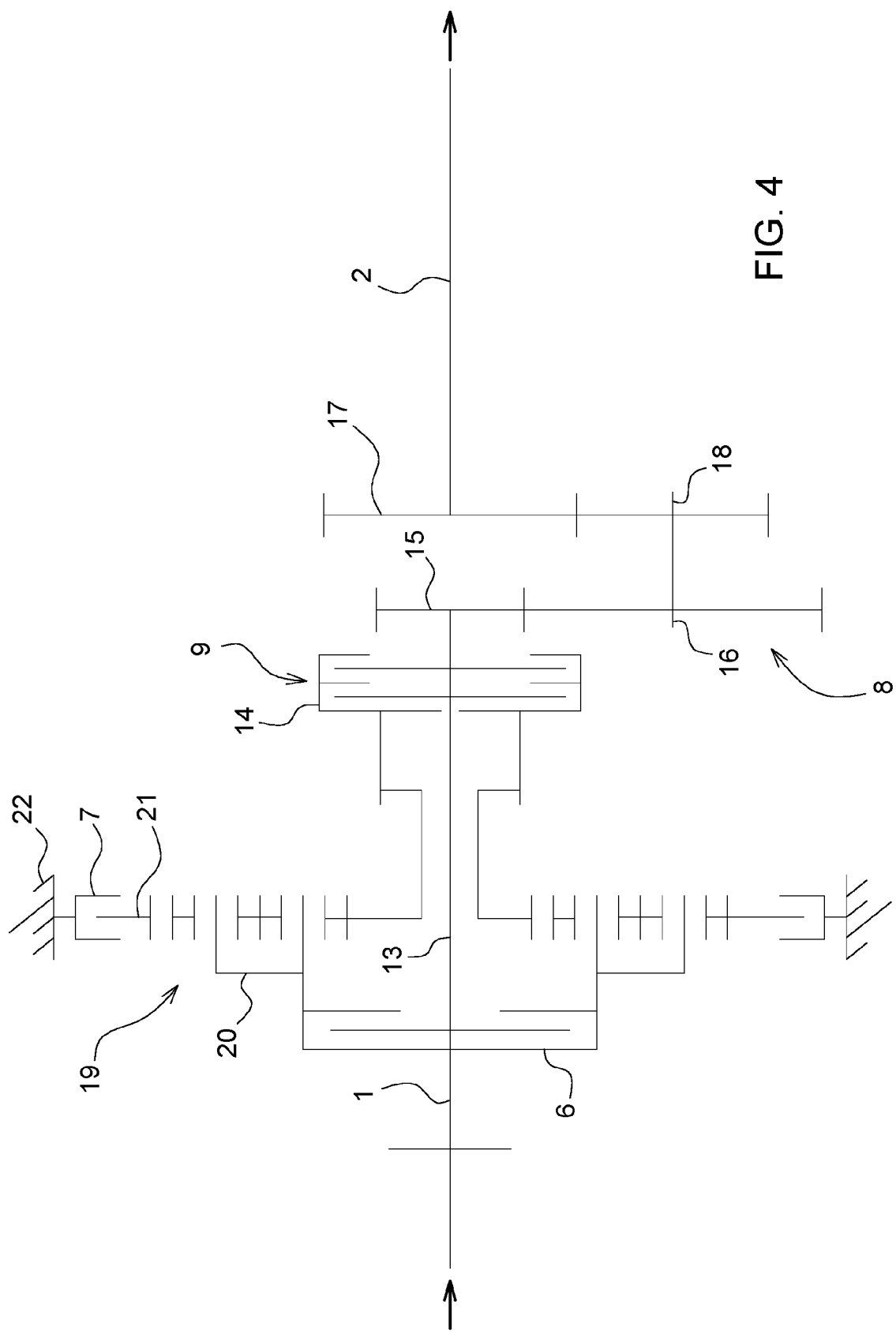

FIG. 4 shows an alternative embodiment of the shifting group according to FIG. 2, wherein the first power path and the second power path are formed by a power-branching planetary stage 19. In this case, the first shaft 1 may be coupled again directly to the multi-disk shaft 13 via the shifting device 6, wherein a planet carrier 20 is also driven via the first shaft 1, the planet carrier 20 being connected to the multi-disk carrier 14. By shifting the shifting device 7, a ring gear 21 of the power-branching planetary stage 19 is connected directly to the housing 22 and this results in a reversal of the rotational direction of the planet carrier 20 and, as a result, in a reverse gear.

Figure 5:
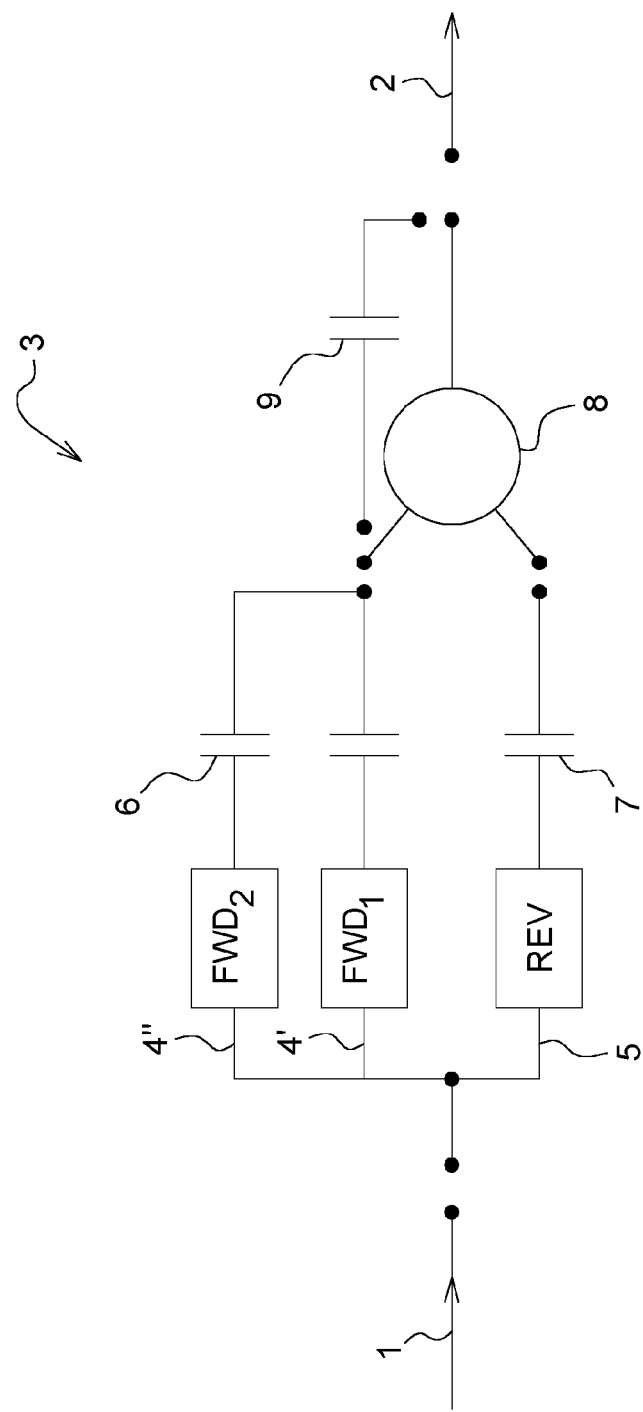
FIG. 5 is a schematic of a transmission with a third power path.

FIG. 5 shows an alternative embodiment according to FIG. 4, wherein a third power path 4" is now provided in addition to the first power path 4' and the second power path 5, the third power path 4" also being configured as a forward gear (FWD2) in a similar manner to the power path 4'.

Figure 6:
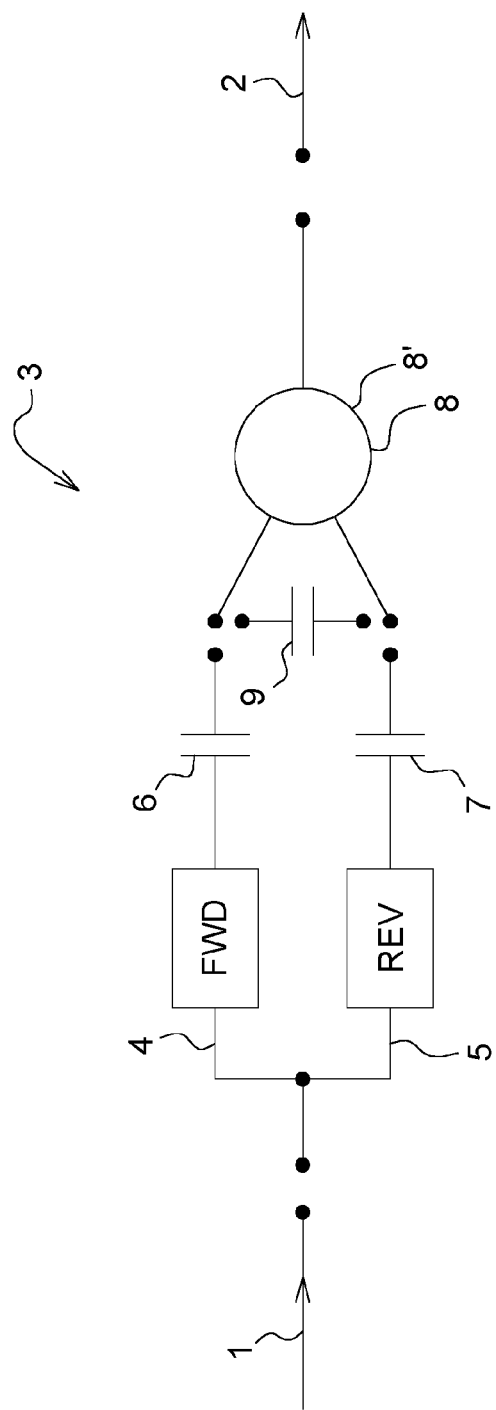
FIG. 6 is a schematic of a transmission.
Figure 7:
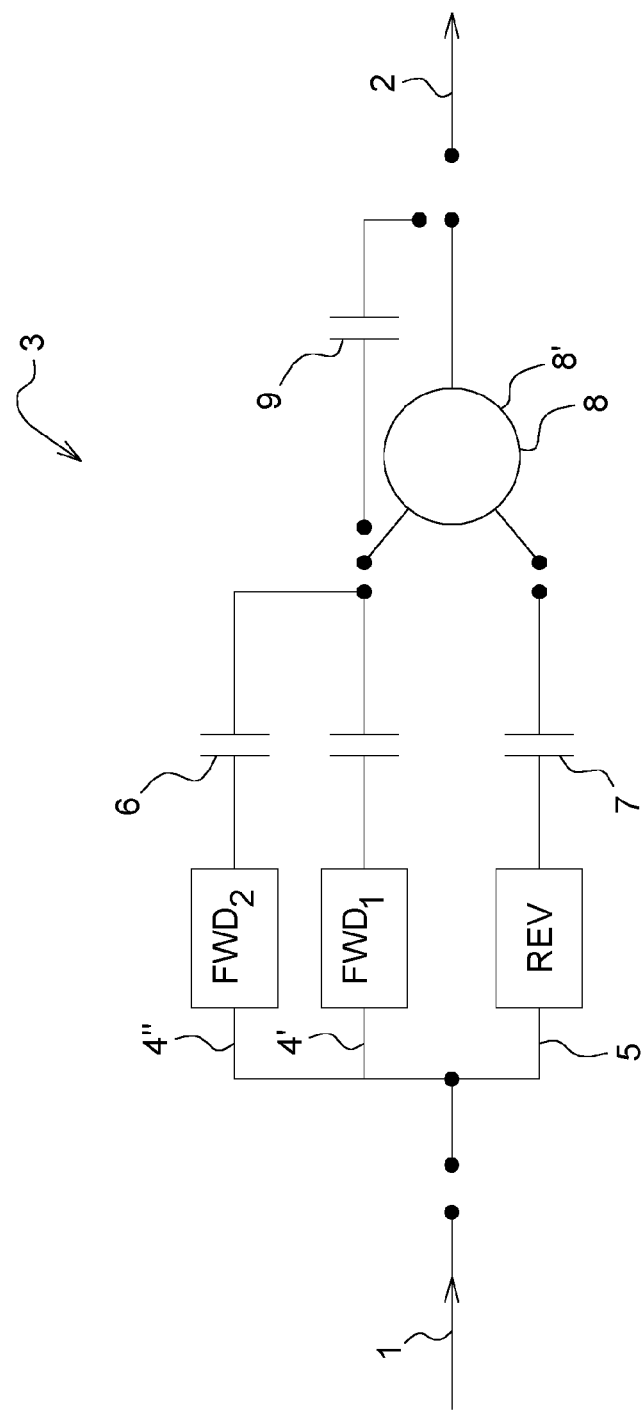
FIG. 7 is a schematic of a transmission with a third power path.

FIGS. 6 and 7 shows the shifting group 3 having a second summation planetary stage 8', wherein both summation planetary stages 8, 8' are connected to the first and the second power paths 4, 5.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A transmission, comprising:
   a first shaft and a second shaft; and
   a shifting group arranged between the first and second shafts, wherein the shifting group is configured such that a mechanical power transmitted via the first shaft is transmitted to the second shaft via a first power path or via a second power path, each of the first power path and the second power path is coupled-in or coupled-out;
   wherein the first power path is designed as a forward gear and the second power path is designed as a reverse gear;
   wherein the forward gear comprises a different transmission ratio in magnitude from the reverse gear; and
   wherein the shifting group comprises a summation planetary stage, the mechanical power of the power paths being transmitted thereby to the second shaft;
   wherein the summation planetary stage comprises a shifting device designed such that the first and the second power paths are directly coupled together or that one respective power path is coupled to an output path of the summation planetary stage, wherein the output path is connected to the second shaft; and
   wherein the summation planetary stage comprises at least two planetary units which are coaxially rotatable relative to one another and connected to the power paths.

2. The transmission as claimed in claim 1, wherein the at least two planetary units are coupled together by the shifting device such that a rotation between the planetary units is blocked.

3. The transmission as claimed in claim 1, wherein the shifting device comprises a multi-disk clutch, a claw clutch or a synchronization unit.

4. The transmission as claimed in claim 1, wherein the at least two planetary units are configured as a first sun gear and a first planet carrier.

5. The transmission as claimed in claim 4, wherein the summation planetary stage comprises a second planet carrier.

6. The transmission as claimed in claim 5, wherein the first and second planet carriers are directly coupled together.

7. The transmission as claimed in claim 6, wherein the second planet carrier or a second sun gear connected to the second planet carrier forms the output path of the summation planetary stage.

8. The transmission as claimed in claim 1, wherein:
   the first or the second power path is formed by a shaft arrangement,
   the first or second power path being connected to the summation planetary stage either directly or by incorporating a spur gear set, and
   the shaft arrangement comprising a second shifting device.

9. The transmission as claimed in claim 1, wherein the first and the second power paths are formed via a power-branching planetary stage.

10. The transmission as claimed in claim 1, wherein:
    the shifting group comprises a third power path,
    the third power path being configured as a forward gear and comprising a different transmission ratio from the first power path.

11. The transmission as claimed in claim 1, wherein the shifting group comprises a second summation planetary stage;
    wherein both summation planetary stages are connected to the first and the second power paths.

12. A transmission, comprising:
    a first shaft;
    a second shaft; and
    a shifting group arranged between the first and second shafts, wherein the shifting group is configured such that a mechanical power transmitted via the first shaft is transmitted to the second shaft via a first power path or via a second power path, each of the first power path and the second power path is coupled-in or coupled-out;
    wherein the first power path is designed as a forward gear and the second power path is designed as a reverse gear;

wherein the forward gear comprises a different transmission ratio in magnitude from the reverse gear;

wherein the shifting group comprises a first summation planetary stage and a second summation planetary stage, the first and second summation planetary stages being connected to the first and the second power paths; and wherein the first summation planetary stage comprises a shifting device designed such that the first and the second power paths are directly coupled together or that one respective power path is coupled to an output path of the summation planetary stage, wherein the output path is connected to the second shaft.

13. A transmission, comprising:

a first shaft and a second shaft; and a shifting group arranged between the first and second shafts, wherein the shifting group is configured such that a mechanical power transmitted via the first shaft is transmitted to the second shaft via a first power path or via a second power path, each of the first power path and the second power path is coupled-in or coupled-out;

wherein the first power path is designed as a forward gear and the second power path is designed as a reverse gear;

wherein the forward gear comprises a different transmission ratio in magnitude from the reverse gear;

wherein the shifting group comprises a summation planetary stage, the mechanical power of the power paths being transmitted thereby to the second shaft; and wherein the first and the second power paths are formed via a power-branching planetary stage.

* * * * *